(12) United States Patent
Fiser et al.

(10) Patent No.: US 8,635,841 B2
(45) Date of Patent: Jan. 28, 2014

(54) CENTER REAR DISCHARGE DECK

(75) Inventors: Jake Fiser, Bryant, AR (US); Seth Chapman, Anderson, SC (US)

(73) Assignee: Husqvarna Consumer Outdoor Products, N.A., Inc., Charlotte, NC (US)

( * ) Notice: Subject to any disclaimer, the term of this patent is extended or adjusted under 35 U.S.C. 154(b) by 0 days.

(21) Appl. No.: 13/819,780

(22) PCT Filed: Aug. 31, 2010

(86) PCT No.: PCT/US2010/047235
§ 371 (c)(1),
(2), (4) Date: Feb. 28, 2013

(87) PCT Pub. No.: WO2012/030325
PCT Pub. Date: Mar. 8, 2012

(65) Prior Publication Data
US 2013/0152538 A1    Jun. 20, 2013

(51) Int. Cl.
*A01D 34/00*    (2006.01)

(52) U.S. Cl.
USPC .......................................................... 56/14.7

(58) Field of Classification Search
USPC .............. 56/10.8, 11.7, 11.8, 14.7, 16.9, 255, 56/295, DIG. 20, DIG. 6, DIG. 4, DIG. 17
See application file for complete search history.

(56) References Cited

U.S. PATENT DOCUMENTS 5,669,213 A    9/1997    Britton

FOREIGN PATENT DOCUMENTS

| JP | 09187140 A | 7/1997 |
|----|------------|--------|
| JP | 2004154048 A | 6/2004 |
| KR | 100262071 B1 | 8/2000 |

OTHER PUBLICATIONS

International Search Report and Written Opinion of PCT/US2010/047235 mailed May 26, 2011.
Chapter II International Preliminary Report on Patentability of PCT/US2010/047235 mailed Dec. 5, 2012.

*Primary Examiner* — Thomas B Will
*Assistant Examiner* — Mai Nguyen
(74) *Attorney, Agent, or Firm* — Nelson Mullins Riley & Scarborough LLP (57) ABSTRACT

To reduce the complexity, maintenance, and cost and increase reliability of a riding lawnmower employing a center rear discharge deck, the riding lawn mowers may be configured with a cutter engagement system which allows for a cutting system to be engaged and disengaged by a user without a motor clutching system. A riding lawn mower may comprise a center rear discharge deck having a single sided belt and a cutter engagement system. The cutter engagement system may be configured to interface with the belt to provide power and opposing rotation movement through one or more cutter engagements and/or gear boxes.

20 Claims, 7 Drawing Sheets

Figure 1

PRIOR ART

CENTER REAR DISCHARGE DECK

TECHNICAL FIELD

The present disclosure relates to vehicles, and in particular, to vehicles configured for lawn maintenance including cutting grass.

BACKGROUND

Grass is commonly maintained with lawn care machinery such as, for example, walk behind lawn mowers, riding lawn mowers, lawn tractors, and/or the like. Riding lawn mowers provide the convenience of a riding vehicle and a larger cutting deck than typical walk-behind lawn mowers. Riding lawn mowers are also generally configured with center rear discharge decks or side discharge decks.

Typically, center rear discharge ("CRD") decks use two to three blades to cut grass and propel grass clippings out the center/rear of the deck. The grass clippings are propelled to the center/rear of the deck by having the left most (with respect to operator seating position) blade rotate clockwise and the right most blade rotating counter clockwise. The counter rotating blades, along with housing shape, push air and grass clippings towards the center rear of the deck. Generally, the blades are driven by a belt with a clockwise rotating engine. The left blade is usually driven with the inside of the belt causing it to rotate in a first direction. The right hand blade is usually driven by the outside of the belt causing it to rotate in a second direction. In order to drive the right hand blade with the outside of the belt, a double-sided belt and several idler pulleys are typically utilized. It is also common practice to tension the belt system using an idler arm on the right side. This deck pulley system tends to utilize an electric or mechanical clutching system at the engine to drive the belt. As such, typical CRD decks employ complicated belt drive, directional, and tensioning arrangements, such as those shown in FIG. 1. These complicated systems require expensive belts, electro-mechanical clutching systems, and various other components which increase the cost and maintenance, and reduce the reliability of typical CRD decks.

SUMMARY

In an exemplary embodiment, a center rear discharge deck system comprises a belt, a first cutter, a gearbox and a second cutter. The belt comprises a first side and a second side. The second side may be configured with a plurality of grooves or teeth to engage the first cutter and the second cutter. The first cutter may comprise one blade. The second cutter may comprise one blade or two blades. The gear box may further comprise a rotatable belt engagement. The rotatable belt engagement may be configured to operate as a clutching mechanism and/or a belt tensioning system. Where the rotatable belt engagement is configured as a clutching system, the first cutter and the second cutter may be engaged and disengaged, based on user input. The center rear discharge deck may further comprise a housing and a discharge. The housing may be configured to at least partially enclose the first cutter and the second cutter, such that clippings produced by the first cutter and the second cutter are retained and conducted to the discharge.

The riding lawnmower may comprise a center rear discharge deck, a frame and a motor. The center rear discharge deck may comprise a belt, a second cutter and a second engagement. The second cutter may be rotatable in a second direction of rotation in response to movement from the belt. The second engagement may be coupled to the second cutter, such that the second engagement is configured to engage the belt at a first position and disengage the belt at a second position. The center rear discharge deck may be coupled to the frame. The motor may also be coupled to the frame and may be configured to provide power and a first movement in a first direction of rotation to the belt.

The lawnmower may further comprise a gear box operatively coupled to the second engagement. The gear box may comprise an engagement gear configured to move in the first direction of rotation and a drive gear configured to move in the second direction of rotation, in response to a movement of the engagement gear.

The second engagement of the lawnmower may be configured as a belt tensioning system and/or a clutching system, such that the first cutter and second cutter can be engaged and disengaged in response to a user input.

An exemplary method for operating a lawnmower may comprise tensioning a belt to a power transfer mechanism of a motor and a second engagement, in response to a user input. The method also includes rotating the second engagement by the belt in a first direction of rotation, wherein the second engagement is coupled to a gear box comprising an engagement gear operatively engaged with a drive gear, and wherein the engagement gear is configured to rotate in the first direction of rotation and the drive gear is configured to rotate in a second direction of rotation. The method further includes rotating a second cutter by the drive gear in the second direction of rotation, wherein the second cutter is at least partially enclosed by a housing. The method further includes rotating a first cutter by the belt at a first engagement in the first direction of rotation, wherein the first cutter is at least partially enclosed by the housing. The method further includes conducting clippings from the first cutter and the second cutter through the housing to a center rear discharge.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

The following description is of various exemplary embodiments only, and is not intended to limit the scope, applicability or configuration of the present disclosure in any way.

Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent exemplary functional relationships and/or physical couplings between various elements. It should be noted that many alternative or additional functional relationships or physical connections may be present in a CRD deck.

Principles of the present disclosure reduce and/or eliminate problems with prior center/rear discharge decks for riding lawn mowers. For example, by eliminating the need for two sided belts, complicated pulley arrangements, and electro-mechanical clutching systems, a CRD deck may be produced in a more cost effective manner. The reliability of a CRD deck is improved by reducing the number of mechanical and/or electro-mechanical components. Similarly, the maintenance of a CRD deck is reduced by reducing the number of mechanical and/or electro-mechanical components.

Figure 2:
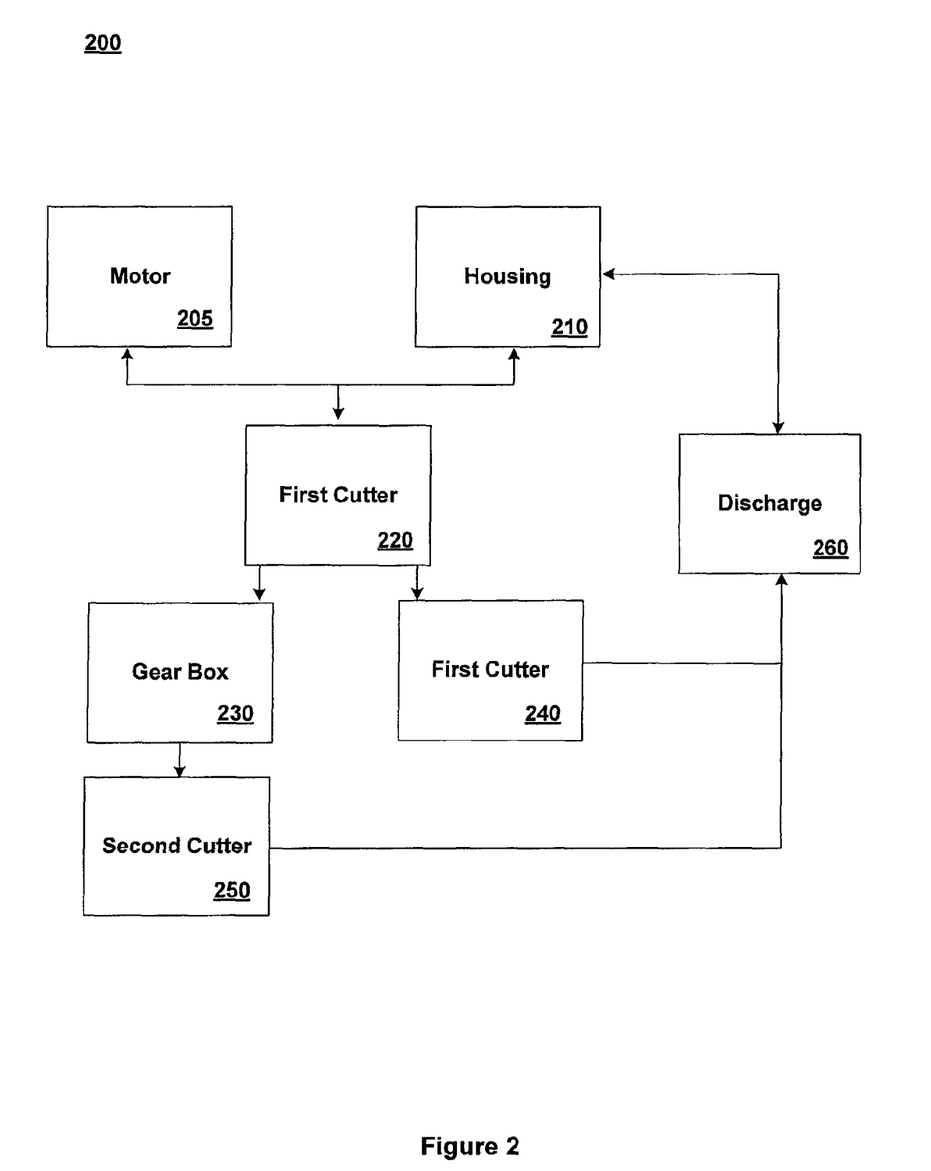
FIG. 2 illustrates a block diagram of components of an exemplary center rear discharge deck, in accordance with an exemplary embodiment.

In various exemplary embodiments, with reference to FIG. 2, a CRD deck 200 may be any mechanical or electro-mechanical system configured to cut vegetation or other items. CRD deck 200 may comprise a housing 210, a belt 220, a gearbox 230, a first cutter 240, a second cutter 250, and/or a discharge 260. CRD deck 200 may also be configured to interface with a motor 205.

CRD deck 200 may be configured to transfer power from motor 205 at belt 220 to first cutter 240. Belt 220 may also be configured to transfer power to gearbox 230, which in turn provides power to second cutter 250. Moreover, belt 220 may be configured to provide power to first cutter 240 and second cutter 250, such that the cutters rotate in opposing directions.

First cutter 240 and second cutter 250 may be operatively coupled within housing 210. First cutter 240 and second cutter 250 may also be configured to conduct clippings (e.g. grass clippings, and/or vegetation clippings) within the volume of housing 210 to discharge 260. Discharge 260 may be configured to exhaust the clippings from housing 210 into a mowed area or into a suitable clipping capture mechanism (e.g. a grass catcher).

Figure 3A:
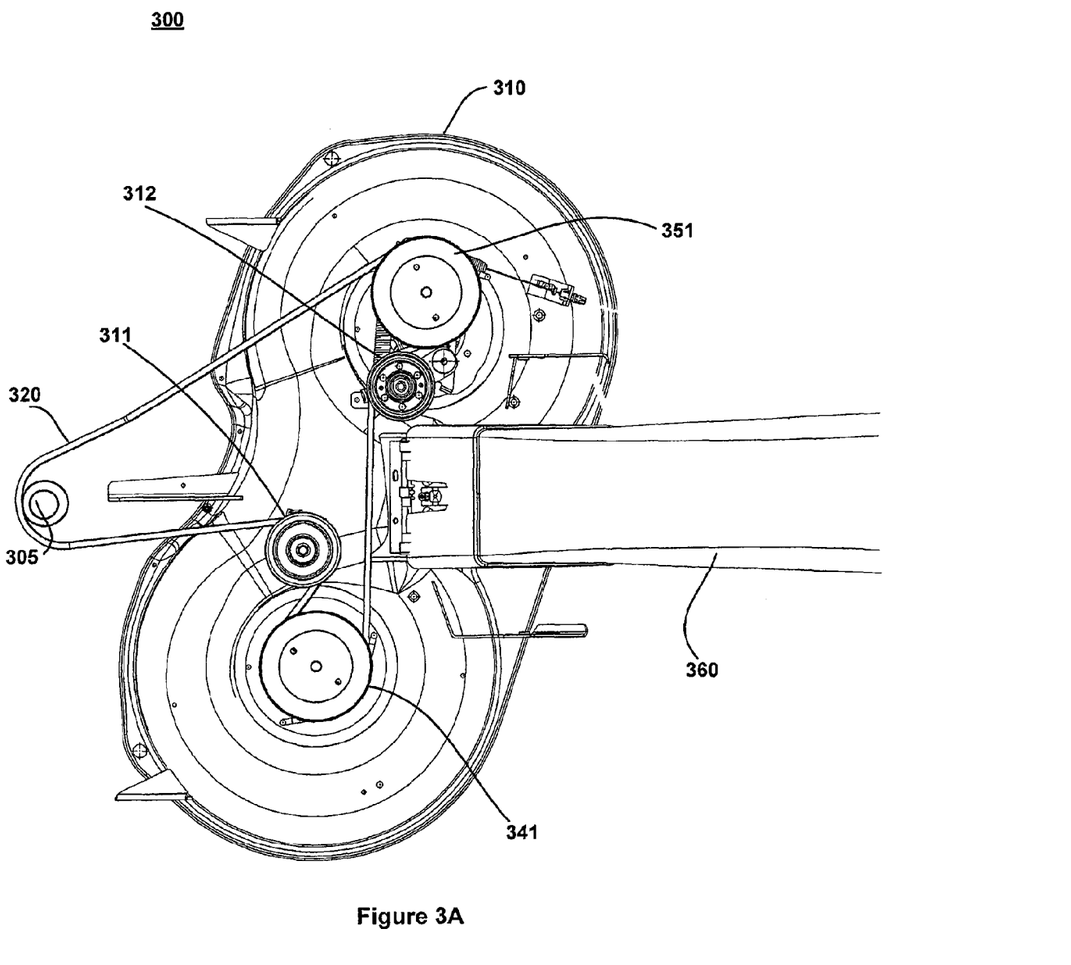
FIG. 3A illustrates a top view of an exemplary center rear discharge deck, in accordance with an exemplary embodiment.
Figure 3B:
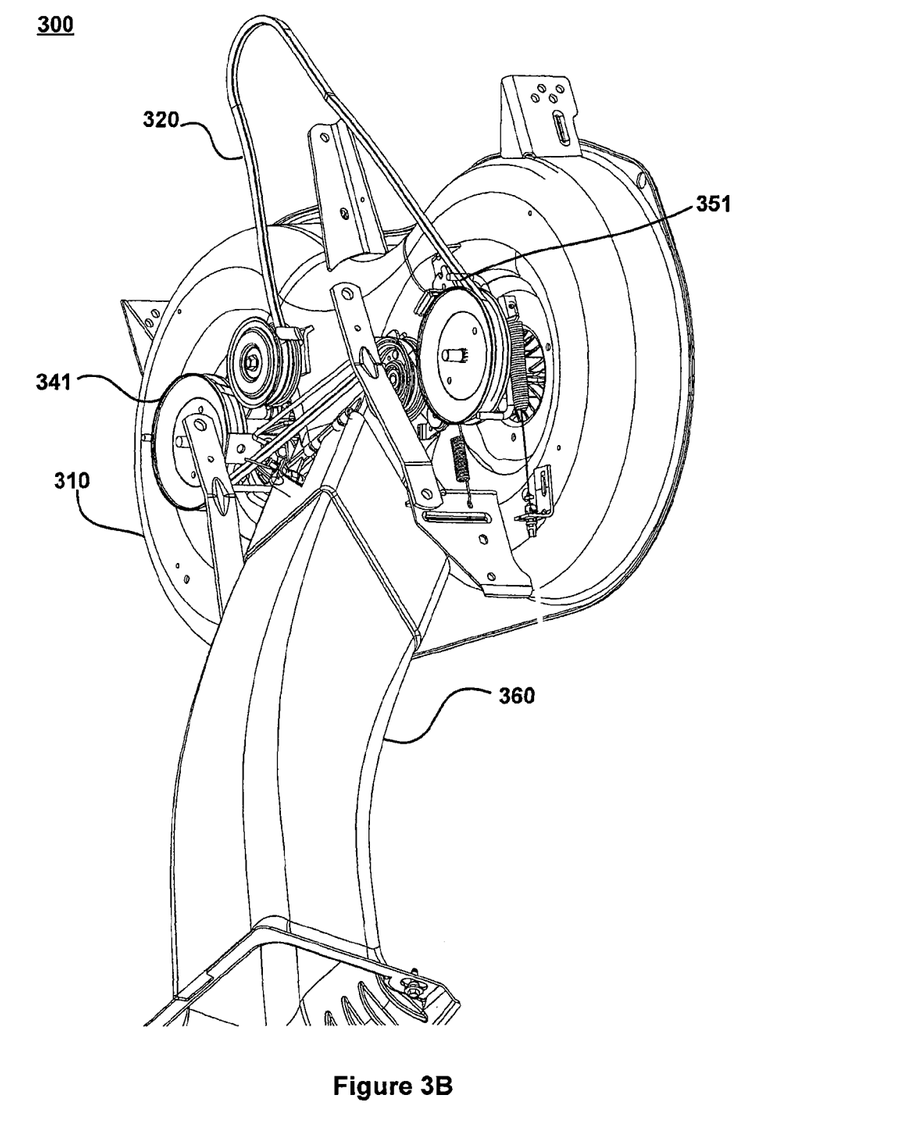
FIG. 3B illustrates a perspective view of an exemplary center rear discharge deck, in accordance with an exemplary embodiment.
Figure 3C:
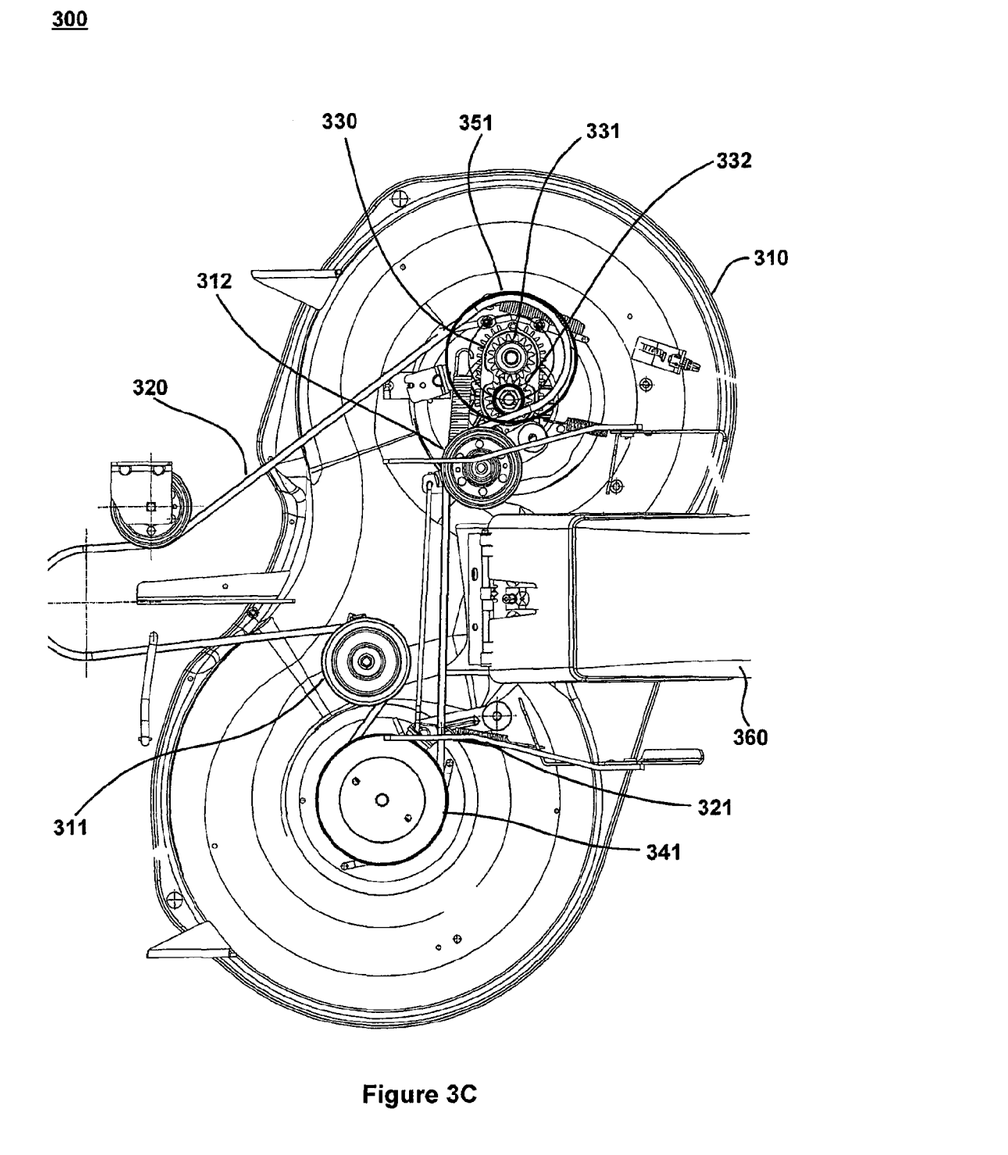
FIG. 3C illustrates a top view of an exemplary gearbox and belt engagement mechanism of center rear discharge deck, in accordance with an exemplary embodiment.

In an exemplary embodiment, and with reference to FIG. 3A, FIG. 3B, and FIG. 3C, a CRD deck 300 may be any suitable mechanical and/or electro-mechanical structure configured to cut vegetation when used with a riding lawnmower. CRD 300 may be configured to receive power from a motor configured with a motor power output mechanism 305. Further, CRD deck 300 may comprise a housing 310, a belt 320, a gearbox 330, a first belt engagement 341, and a second belt engagement 351. Gearbox 330 may be coupled to housing 310. First belt engagement 341 may also be coupled housing 310. Second belt engagement 351 may be configured to engage gearbox 330 and may be coupled to housing 310. Belt 320 may be configured to couple with motor power output mechanism 305 and conduct power from a generator to the various components of CRD deck 300. For example, belt 320 may be configured to engage first belt engagement 341 and second belt engagement 351, such that the power and corresponding movement provided from motor power output mechanism 305 to belt 320 causes movement of second belt engagement 351 and movement of gearbox 330.

Motor power output mechanism 305 any suitable transfer mechanism coupled to any suitable generator configured to provide output power. Motor power output mechanism 305 may include, for example, a shaft, a gear, a fly wheel, and/or the like. The generator may be an internal combustion engine, an electric motor, or any other suitable power generator.

Housing 310 may be any suitable structure configured to contain and conduct a substantial portion of grass clippings to a discharge. Housing 310 may define a volume. The volume may be any suitable shape for retaining and conducting a substantial portion of clippings. Housing 310 may be made of metal, plastic, composite, or any other suitable material that is durable enough for use in lawn maintenance equipment.

Housing 310 may be monolithic. Housing 310 may comprise multiple components coupled together. Moreover, housing 310 may be cast, pressed, sintered, die-cut, machined, stamped, bonded, laminated, polished, smoothed, bent, rolled, molded, plated, coated, and/or otherwise shaped and/or formed via any suitable method and/or apparatus.

Belt 320 may be any mechanism suitably configured to conduct power. Belt 320 comprises a first side and a second side. The first side may be substantially smooth such that it freely passes over a transfer mechanism, such as for example a pulley. The second side may comprise a friction mechanism or a friction surface (e.g. grooves, teeth and/or the like). Belt 320 may be operatively coupled to motor power output mechanism 305 at, for example, a shaft, fly wheel, or other suitable engagement point. Further, belt 320 may operatively couple to engagement mechanisms operatively coupled to first cutter 340 and gearbox 330.

In an exemplary embodiment, and with reference to FIG. 3A and FIG. 3C, gearbox 330 may be any suitable power transfer mechanism. Gearbox 330 may be configured as a system of two or more gears, a worm drive, and/or any other suitable power transfer mechanism. Gearbox 330 may comprise an engagement gear 331 and a drive gear 332. Engagement gear 331 may be operatively coupled to second engagement 351. Engagement gear 331 may be configured to rotatable couple to or otherwise engage drive gear 332. This configuration causes second engagement 351 and engagement gear 331 to rotate in the same direction as the power transfer mechanism of motor power output mechanism 305. As such, the configuration and coupling of engagement gear 331 and drive gear 332 causes the gears to rotate in opposing directions, such that drive gear 332 rotates in the opposite direction of the power transfer mechanism of motor power output mechanism 305. Moreover, drive gear 332 may couple to and drive a shaft. The shaft may be couple to second cutter 350. In an exemplary embodiment, second engagement 351 may be configured to transfer power and a resulting torque from belt 320 to engagement gear 331. In turn, engagement gear 331 causes drive gear 332 to rotate.

In an embodiment, first engagement 341, second engagement 351, engagement gear 331, and drive gear 332 may each be any suitable size. First engagement 341, second engagement 351, engagement gear 331, and drive gear 332 may be proportionally sized to achieve a desired rotational relationship between first cutter 340 and second cutter 350. For example, first engagement 341, second engagement 351, engagement gear 331, drive gear 332 may be sized such that first cutter 340 and second cutter 350 rotate at substantially the same rotational speed (e.g. substantially the same rpm).

Second engagement 351 and gearbox 330 may be configured as a belt tensioning system. As discussed above, drive gear 332 may be coupled to and drive a shaft. The shaft may be coupled to second cutter 350 and causes second cutter 350 to rotate when belt 320 engages second engagement 351. Second engagement 351 may also be configured to rotate about or with respect to the shaft such that belt 320 is loosened or tightened depending on a user selecting operating condition. For example, second engagement 351 may be coupled to a belt tensioning mechanism 321.

Belt tensioning mechanism 321 may be any suitable mechanism or assembly configured to accept a user input and cause the position of at least one first engagement 341 and second engagement 351 to change position in response to the user input. For example, belt tensioning mechanism may include various linkage assemblies, cables, springs, fasteners, force transfer mechanisms, assemblies, and the like.

Where belt 320 is loosened based on a user input at the belt tensioning mechanism 321, belt 320 blossoms (e.g. loosens such that belt 320 does not engage and/or rotate the first engagement 341 and/or second engagement 351) and the motor is able to run and otherwise drive the riding lawnmower without first cutter 340 or second cutter 350 rotating. Where the user desires to employ first cutter 340 and second cutter 350, the user may provide an input to the belt tensioning mechanism, which causes belt 320 to rotate, such that belt 320 tightens about second engagement 351. The rotation and resulting tightening cause belt 320 to engage and drive first engagement 340 and second engagement 351, which in turn drives first cutter 340 or second cutter 350.

The configuration and rotation of second engagement 351 also acts as a clutching system. As discussed above, this clutching system allows the user to select whether to operate first cutter 340 and second cutter 350, while still being able to drive a riding lawn mower under the power of the motor.

Figure 1:
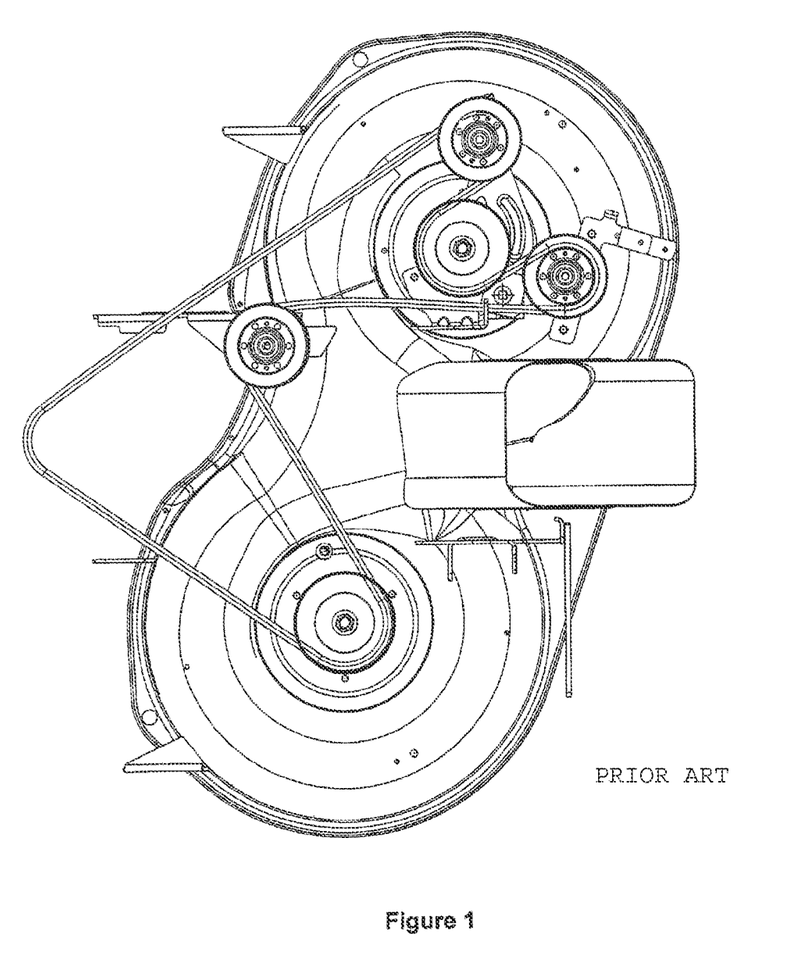
FIG. 1 illustrates a prior art center rear discharge deck.

This configuration also reduces the need for expensive components and a complicated electromechanical system, including for example, a double sided belt, idler pulleys, and a motor clutching system. In particular, the double sided belt (as shown in FIG. 1) is no longer needed because the configuration of engagement gear 331 and drive gear 332 provide a rotational movement to second cutter 350 in the opposite direction as the rotation of motor power output mechanism 305. The idler pulley (as shown in FIG. 1) is no longer needed because a one sided belt may be employed and appropriate tension may be applied to belt 320 using second engagement 351. The motor clutching system (which is typically employed with a system like that shown in FIG. 1) is also no longer needed because of the rotating functionality of second engagement 351, which allows the user to engage and disengage first cutter 340 and second cutter 350.

CRD 300 may further comprise one of more pulleys, including for example pulley 311 and/or pulley 312. Pulley 311 and/or pulley 312 may be coupled to housing 310. Moreover, pulley 311 and/or pulley 312 may be configured to freely rotate, while maintaining their respective position on housing 310. Pulley 311 may be configured to slidably engage and direct belt 320. Similarly, pulley 312 may be configured to slidably engage and direct belt 320. Pulley 311 and/or pulley 312 may be configured to engage the first side of belt 320. As such, pulley 311 and/or pulley 312 are configured to allow belt 320 to freely pass over pulley 311 and/or pulley 312 with minimal friction.

In an embodiment, pulley 311 and/or pulley 312 may each be any suitable size. Pulley 311 and/or pulley 312 may be proportionally sized to achieve a desired rotational relationship between first cutter 340 and second cutter 350. For example, pulley 311 and/or pulley 312 may be sized such that first cutter 340 and second cutter 350 rotate at substantially the same rotational speed (e.g. substantially the same rpm).

Figure 3D:
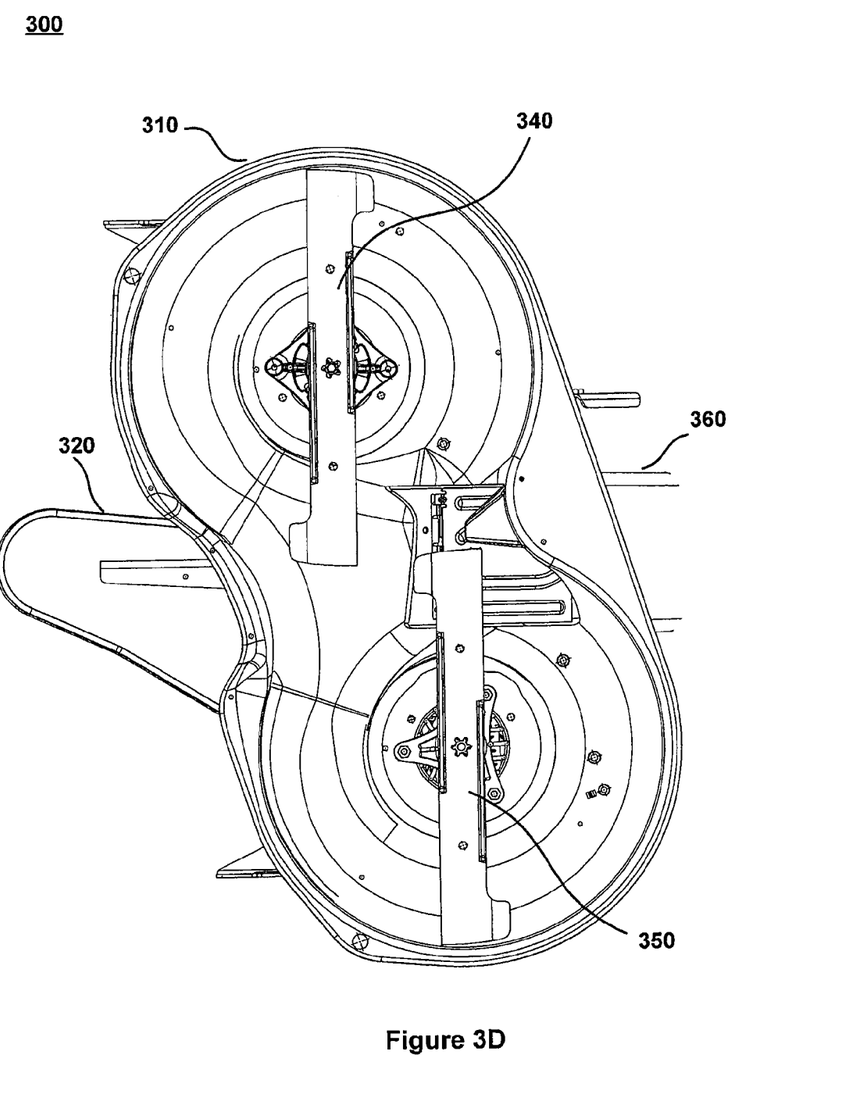
FIG. 3D illustrates a bottom view of an exemplary center rear discharge deck, in accordance with an exemplary embodiment.

In an exemplary embodiment and with reference to FIG. 3C and FIG. 3D, CRD deck 300 may further comprise a first cutter 340 and a second cutter 350. First cutter 340 may couple to first engagement 341. As such, first cutter may be rotated to belt 320 in the same direction as motor power output mechanism 305. Second cutter 350 may couple to drive gear 332. As such, second cutter 350 rotates in the opposite direction of the motion of both first cutter 340 and motor power output mechanism 305.

In an embodiment, the respective swept circles of first cutter 340 and second cutter 350 may not overlap (e.g. the distance between centers of first cutter 340 and second cutter 350 are more than twice the blade radius). First cutter 340 and second cutter 350 the cutters may be transversely offset by, for example, approximately 10 degrees to 30 degrees so that no track of uncut grass is left between first cutter 340 and second cutter 350.

First cutter 340 may be any structure or mechanism configured to cut vegetation or other items. First cutter 340 may comprise at least one blade. In various embodiments, first cutter 340 may comprise more than one blade. In various embodiments, first cutter 340 may comprise more than one blade. First cutter 340 may also be coupled to a shaft, such that first cutter 340 is able to rotate. In an embodiment, a first cutter 340 is driven by belt 320 at a belt engagement mechanism, wherein the second side of the belt drives the engagement mechanism. The belt engagement mechanism may couple directly to the shaft, and as such first cutter 340 may be rotated in the same direction as the drive mechanism.

Like first cutter 340, second cutter 350 may be any structure or mechanism configured to cut vegetation. Second cutter 350 may comprise at least one blade. In various embodiments, second cutter 350 may comprise more than one blade. Second cutter 350 may also be coupled to a shaft, such that second cutter 350 is able to rotate. In an embodiment, a second cutter 350 is driven by belt 320 at a belt engagement mechanism through gearbox 330, wherein the second side of the belt drives the engagement mechanism. The belt engagement mechanism may couple to a first gear in the gearbox which rotates in the same direction as the drive mechanism. The first gear may interface with a second gear. The second gear may be coupled to the shaft which supports second cutter 350. Further, the first gear may drive the second gear, causing the second gear to rotate in a direction that is opposite of the rotation of the drive mechanism. As such, second cutter 350 may be rotated in a direction that is opposite of the rotation of the drive mechanism.

First cutter 340 may have a substantially rectangular shape, having two long sides and two shorter ends. Additionally, first cutter 340 may include various balancing and/or tuning mechanisms and/or structures, including for example, tabs at each end of first cutter 340. First cutter 340 may be configured with at least one substantially tapered (e.g. substantially sharp) edge along the leading long side (e.g. the long side which engages vegetation based on the direction of rotation of first cutter 340). In various embodiments, first cutter 340 may be configured with a substantially tapered (e.g. substantially sharp) edge along each long side, which allows first cutter 340 to more effectively cut various thickness or vegetation and produce a smaller (e.g. more finely chopped) clipping. Moreover, first cutter 340 may be configured with one or more blades as described above.

Similar to first cutter 340, second cutter 350 may have a substantially rectangular shape, having two long sides and two shorter ends. Additionally, second cutter 350 may include various balancing and/or tuning mechanisms and/or structures, including for example, tabs at each end of second cutter 350. Second cutter 350 may be configured with at least one substantially tapered (e.g. substantially sharp) edge along the leading long side (e.g. the long side which engages vegetation based on the direction of rotation of second cutter 350). Second cutter 350 may be configured with substantially tapered (e.g. substantially sharp) edge along each long side, which allows second cutter 350 to more effectively cut various thickness or vegetation and produce a smaller (e.g. more finely chopped) clipping. Moreover, second cutter 350 may be configured with one or more blades as described above.

In an exemplary embodiment, and with continued reference to FIG. 3A and FIG. 3D, discharge 360 may be any structure suitable for conducting clippings from housing 310. Discharge 360 may be coupled to housing 310. For example, discharge 360 may be a chute, conduit, tube, or any other suitable structure. Discharge 360 may couple at or near the center of housing 310 between first cutter 340 and second cutter 350. As such, discharge 360 may be configured to exhaust clippings from the back of a riding lawn mower (e.g. away from the direction of travel of the mower).

Figure 4:
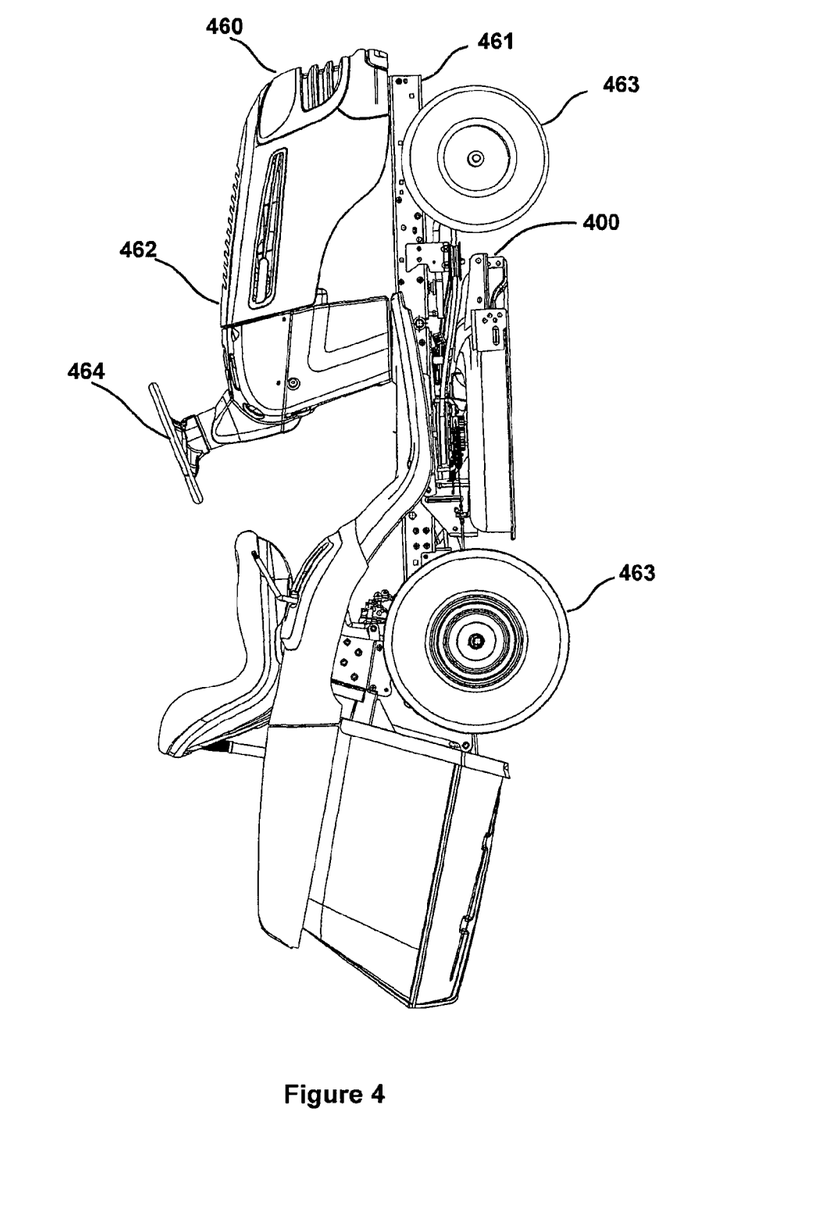
FIG. 4 illustrates an exemplary center rear discharge deck couple to a riding lawn mower, in accordance with an exemplary embodiment.

In an exemplary embodiment, and with reference to FIG. 4, the CRD deck 400 may be provided as a component of a mowing system. CRD deck 400 may be coupled to or installed on a riding lawnmower 460. Riding lawnmower 460 may be any suitable lawnmower or lawn-tractor suitably configured to accept a rear discharge deck. Riding lawnmower 460 may be configured to accept and obtain power from motor 405. Moreover, the riding lawnmower may comprise a frame 461, a body 462, wheels 463, a steering system 464 and various other components, including for example, gauges, lights, a fuel tank, a starting system, and/or the like.

Riding lawnmower 460 may be configured with any type of steering system 464, including for example, zero-turn steering, a standard steering configuration, or any other suitable configuration now known or hereinafter devised. Moreover, riding lawnmower 460 may employ any accessory available or otherwise configured to interface with CRD deck 400 including for example, a vacuum system, a bagging system, a blower system, or any other system now known or hereinafter devised.

While the principles of this disclosure have been shown in various embodiments, many modifications of structure, arrangements, proportions, elements, materials and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A center rear discharge deck system, comprising:
a belt comprising a first side and a second side;
a first cutter operatively engaged by the second side of the belt;
a gearbox operatively engaged by the second side of the belt, wherein the gearbox comprises a drive gear and an engagement gear operatively engaged with the drive gear, wherein the engagement gear is configured to rotate in a first direction of rotation and the drive gear is configured to rotate in a second direction of rotation, and wherein the first and second directions of rotations being opposing directions of rotation;
a second cutter coupled to the drive gear so that the first cutter and the second cutter rotate in opposing directions in response to movement from the belt;
an engagement coupled to the engagement gear so that the engagement is configured to be rotated by the belt in the first direction of rotation, wherein the engagement and engagement gear are configured to be moved from a first position that engages the belt to a second position that disengages the belt.

2. The system of claim 1, further comprising a belt tensioning device to move the engagement from the first position to the second position.

3. The system of claim 2, wherein the belt tensioning device axially moves the engagement and the engagement gear about the drive gear, thereby disengaging the belt with the engagement.

4. The system of claim 1, wherein the engagement comprises a pulley connected with the engagement gear, and wherein the pulley is coupled with the belt to rotate the engagement gear when the engagement is in the first position.

5. The system of claim 1, wherein the second cutter is coupled to a shaft and the shaft is also coupled to the drive gear so that when the drive gear rotates, the second cutter also rotates.

6. The system of claim 1, wherein the engagement is coupled to the engagement gear along a common shaft such that the engagement gear and the engagement rotate in the same direction.

7. The system of claim 1, further comprising a plate connected to the gearbox to rotate the gearbox and the engagement to disengage the belt with the engagement.

8. The system of claim 1, wherein the rotatable belt engagement is configured as a clutching system such that the first cutter and the second cutter may be engaged and disengaged based on user input.

9. The system of claim 1, further comprising a motor configured to provide a movement in a first direction of rotation and power to a belt.

10. A lawnmower, comprising:
a center rear discharge deck comprising:
   a belt,
   a second cutter movable in response to movement from the belt;
   an engagement gear configured to rotate in a first direction of rotation;
   a drive gear operatively engaged with the engagement gear and the second cutter;
   an engagement coupled to the engagement gear and rotatably coupled to the second cutter, wherein the engagement is configured to engage the belt in a first position and disengage the belt in a second position by rotating about the drive gear;
   a frame wherein the center rear discharge deck is coupled to the frame; and
   a motor coupled to the frame, wherein the motor is configured to provide power and a first movement in a first direction of rotation to the belt.

11. The lawnmower of claim 10,
wherein the engagement and engagement gear are attached to a first common shaft and rotate in a first direction of rotation,
wherein the second cutter and the drive gear are attached to a second common shaft,
wherein the drive gear is coupled to the engagement gear to rotate both the drive gear and second cutter in a second direction of rotation, and
wherein the first and second directions of rotation are substantially opposite.

12. The lawnmower of claim 11, further comprising a first cutter movable in the first direction of rotation in response to movement from the belt.

13. The lawnmower of claim 10, wherein the belt comprises a first side and a second side, and wherein the first side comprises a substantially smooth surface, and wherein the second side comprises a plurality of grooves or a plurality of teeth.

14. The lawnmower of claim 10, further comprising a belt tensioning device to move the engagement from the first position to the second position, thereby disengaging the belt with the engagement.

15. The lawnmower of claim 14, wherein the belt tensioning device comprises a spring device.

16. A method for operating a lawnmower comprising:
tensioning a belt to a power transfer mechanism of a motor and a second engagement in response to user input, wherein the second engagement is coupled to an engagement gear via a shaft, and wherein the engagement gear is operatively engaged with a drive gear;
rotating the second engagement by the belt in a first direction of rotation, thereby rotating the engagement gear in the first direction of rotation and rotating the drive gear in a second direction of rotation;
rotating a second cutter by the drive gear in the second direction of rotation, wherein the second cutter is at least partially enclosed by a housing; and
rotating a first cutter by the belt at a first engagement in the first direction of rotation, wherein the first cutter is at least partially enclosed by the housing,
wherein the second engagement is configured to be moved from a first position to a second position, wherein the first position corresponds to engaging the belt with the second engagement, and wherein the second position corresponds to disengaging the belt with the second engagement.

17. The method of claim 16, wherein the engagement gear is axially moved about the drive gear when the second engagement is moved from the first position to the second position.

18. The method of claim 16, wherein the second engagement and engagement gear are attached to a first common shaft and rotate in a first direction of rotation, wherein the second cutter and the drive gear are attached to a second common shaft, wherein the drive gear is coupled to the engagement gear to rotate both the drive gear and second cutter in a second direction of rotation.

19. The method of claim 16, wherein the first direction of rotation is substantially opposite to the second direction of rotation.

20. The method of claim 16, further comprising conducting clippings from the first cutter and the second cutter through the housing to a center rear discharge.

* * * * *